United States Patent [19]

Deuter

[11] Patent Number: 5,445,967
[45] Date of Patent: Aug. 29, 1995

[54] METHOD FOR ANALYZING A COMPONENT OF A LIQUID SAMPLE

[75] Inventor: Klaus Deuter, Freising, Germany

[73] Assignee: Boehringer Mannheim GmbH, Mannheim, Germany

[21] Appl. No.: 319,477

[22] Filed: Oct. 7, 1994

Related U.S. Application Data

[63] Continuation of Ser. No. 889,334, May 28, 1992, abandoned.

[30] Foreign Application Priority Data

May 31, 1991 [DE] Germany .................. 41 17 847.5

[51] Int. Cl.$^6$ .................. G01N 21/00; G01N 21/75; G01N 31/22
[52] U.S. Cl. .................. 436/164; 422/56; 422/58; 235/462
[58] Field of Search .................. 436/164, 165; 422/55, 422/56, 58; 235/462, 463, 454; 364/413.01, 413.02, 413.07, 413.08, 413.09, 413.1, 413.11

[56] References Cited

U.S. PATENT DOCUMENTS

| | | | |
|---|---|---|---|
| 4,020,357 | 4/1977 | Punis | 250/568 |
| 4,101,072 | 7/1978 | Weaver et al. | 235/455 |
| 4,219,152 | 8/1980 | Couch et al. | 235/463 |
| 4,509,859 | 4/1985 | Markart et al. | 356/446 |
| 4,510,383 | 4/1985 | Ruppender | 235/462 |
| 4,521,678 | 6/1985 | Winter | 235/472 |
| 4,553,027 | 11/1985 | Silkman | 235/474 |
| 4,592,893 | 6/1986 | Poppe et al. | 422/56 |
| 4,852,025 | 7/1989 | Herpichböhm | 364/551.01 |
| 4,989,983 | 2/1991 | Terada et al. | 356/423 |
| 5,019,974 | 5/1991 | Beckers | 364/413.02 |
| 5,231,576 | 7/1993 | Suzuki et al. | 364/413.09 |

Primary Examiner—Gail O. Hayes
Assistant Examiner—Stephen R. Tkacs
Attorney, Agent, or Firm—Nikaido, Marmelstein, Murray & Oram

[57] ABSTRACT

A method and apparatus for analyzing a component of a liquid sample performs the analysis in a number of steps. A test-strip analyzer is provided, which includes a test-strip, a code substrate, and a valuation device. The test-strip includes reagents, and the component of the liquid sample reacts with the reagents. The reaction results in a physically detectable change. The method includes the steps of initiating a relative motion between the code substrate and an optical-electrical transducer of the valuation device, and generating a binary signal in the analyzer. The binary signal is generated as a result of the relative motion, and contains information of the valuation code and the optical transducer during the motion scanning at least one track of the analytical code. An output voltage is generated from detected brightness values, and maximum and minimum peak voltages are ascertained when reading a bright zone and a dark zone, respectively. A first and second comparison voltages are generated, with the first comparison voltage being less by a first amount than a maximum peak voltage value, and the second comparison voltage being larger by a second amount than the minimum peak voltage value. The output voltage of the transducer is compared with the first and second comparison voltages. The minimum peak voltage value is reset to a higher voltage value when the output voltage drops below the first comparison voltage, and the maximum peak voltage value is reset to a lower peak voltage value when the output voltage rises above the second comparison voltage.

19 Claims, 7 Drawing Sheets

METHOD FOR ANALYZING A COMPONENT OF A LIQUID SAMPLE

This application is a continuation of application Ser. No. 07/889,334 filed May 28, 1992, now abandoned.

BACKGROUND OF THE INVENTION

1. Field of the Invention

The invention concerns a method for analyzing a component of a liquid sample, in particular a body fluid, using a test-strip analyzing system, ie, an analyzer, and it concerns further a test-strip analyzer to implement the method. The system includes three functional parts, namely test-strips containing reagents of which the reaction with the sample entails a physically detectable change, code substrates evincing a machine-readable valuation code needed to assess the physically detectable changes, and a valuation device measuring the physically detectable change and converting it into the analytical result. The test-strips may be designed to be the code substrate at the same time.

Test-strip analyzers are especially widespread in medicine to analyze urine and blood. On the whole a test-strip is characterized by containing reagents in a packaged unit, said reagents being needed to carry out a particular analysis (parameters). The reagents are contained in the test-strip in such a manner that they contact the sample in the required sequence. Dry reagents are dissolved in the sample and mixed therewith. Most of the time the physically detectable change is a change in color taking place in an optical cell or on a test layer, and which is measured by photometry. However other optical (for instance fluorometric) or non-optical (for instance electrochemical) detectable, physical changes also are used.

2. Description of the Prior Art

There are many and very different kinds of test-strips and corresponding analyzers. Illustratively so-called test-pack systems are available, wherein the reagents are present in dry or liquid form in small chambers of a plastic envelope, these chambers communicating with each other by ducts allowing sample flow through them. Illustratively the sample liquid can be displaced by squeezing the plastic envelope, by resort to capillary forces or by centrifugal forces. In particular the invention applies to systems in which the test-strips are the test media, that is, analytical elements containing the reagents in one or more test layers, most of them deposited on one base layer. However other forms of test media are also conventional, for instance flat, nearly square chips with a test zone at the center. In the case of test media, the sample as a rule is deposited by dripping onto a test layer (starting layer) provided for that purpose, or when testing urine, also by dipping the test medium into the sample. As a rule test packs comprise a start chamber into which the sample is introduced by a pipette.

The valuation device comprises a test-strip seat to position a test-strip to be valuated into a measurement position and further it comprises a meter to measure the physically detectable change. Illustratively the meter may be the already mentioned photometer or, in the case of an electrochemical analytical element, a circuit measuring current or voltage. In every instance the meter emits a measurement signal R from which the concentration can be ascertained.

As a rule the test-strips are analysis-specific, that is, one type of test medium serves to determine the concentration of a particular component of a body fluid and defined as the parameter. For a specific type of test-strip, for instance for the analysis of glucose or cholesterol in blood, a definite relation exists between the measurement signal R and the concentration C. This relation is termed the valuation curve C(R).

The valuation code contains data required to analyze a test-strip by the valuation device. Said code may be deposited on the analytical element itself. In that event code medium is in the form of a label bonded to the analytical element or in the event of test strips, it shall be their base layer (especially the back side of the base layer). However a code carrier element separate from the analytical element may also be provided, for instance in the form of a code film, a code strip or a code card, which are introduced into the valuation device along a pre-determined insertion path.

A particular problem in transmitting the valuation code from the code substrate to the valuation device of a test-strip analyzer is that on one hand the amount of data required by the valuation device is comparatively large and on the other hand the code substrate as a rule offers little space to mount the code.

The analytical element itself only provides a very small zone to mount the code, the more so that the trend is toward ever smaller analytical elements (especially test strips or other test media). Highest compactness also is desired as a rule even for separate code substrates, for instance to allow joint packing with the analytical elements or also to minimize the size of the valuation device.

Test-strip analyzers require comparatively high rates of data transmission especially because a valuation curve C(R) dependent on the preparation batch of the teststrips is present on the code substrate and must be read by the code-reader of the valuation device. Where accuracy must be high, a single valuation curve C(R) does not permit valuing test-strips from different preparation batches. Therefore the particular valuation curve must be transmitted to the valuation device prior to the valuation of a test-strip or at least periodically when test-strips from a new preparation batch must be used. This problem is discussed more closely in the European patent document EP A 73 056 or U.S. Pat. No. 4,592,893. The valuation curves most of the time being fairly complex and non-linear, the valuation code must contain a large amount of information.

It follows from the large amount of data and the small available area that the data density is very high, for instance in the case of a bar code comparatively fine code lines tightly against each other must be used.

Code readers for machine-readable codings of high information density are available per se. However in the known designs, highly expensive devices are used, for instance laser light beams, high-grade focusing optics and signal-processing methods requiring powerful microcomputers. Such costs are admissible in many applications such as in the bar-code readers used in cash registers. On the other hand the valuation devices of test-strip analyzers are small most of the time and battery-operated, frequently not exceeding the size of a typical pocket computer. They are meant to be available on a continuous base in the field of the so-called "home monitoring" to the individual patients requiring continuous monitoring of certain parameters and therefore they must be fairly simple to build and be manufactured economically. A significant example of such a device is the glucose analyzer of diabetic sufferers. Recently however other parameters as well have been ascertained in the field of home monitoring, such as cholesterol levels, and valuation devices are being offered that can assess different parameters. The invention covers especially such multi-parameter systems.

SUMMARY OF THE INVENTION

As regards the analysis of body fluids using test-strip analyzers, it is accordingly the object of the present invention to create a method for reading a valuation code consisting of bright and dark zones arranged at least along one track, said method allowing reliably reading a code of high information density with a trivial amount of hardware.

This object is achieved by the invention by means of a method to analyze a component of a liquid sample, in particular a body fluid, using a test-strip analyzer comprising a test-strip, a code substrate and a valuation device, the test-strip containing reagents, the sample being brought into contact with the reagents and the reaction of the reagents and the component resulting in a physically detectable change, the code substrate comprising a binary valuation code in the form of bright and dark zones along at least one track and in the manner of a preset symbol code, the valuation device comprising a test-strip seat to position a test-strip into a measurement position in order to measure the physically detectable change and to generate a measurement signal, said valuation device further comprising a code reader to read the valuation codes contained on the code substrate and mathematical conversion means to compute the analytical result from the measurement signal while taking into account the valuation code, a relative motion between code substrate and a photo-electric transducer, ie an optical transceiver, generating the binary signal containing the information of the valuation code, said optical transceiver scanning at least one track of the valuation code and generating an output voltage from the detected brightness values, the maximum and minimum peak voltages of the output voltage being determined, a first comparison voltage being generated that is smaller by a predetermined first amount than the maximum peak voltage, a second comparison voltage being obtained that is larger by a second predetermined amount than the minimum peak voltage, the output voltage of the optical transceiver being compared with the comparison voltages, the output voltage being compared with the first comparison voltage and the binary signal being moved into a first binary state and the minimum peak voltage being reset to a higher voltage value when the output voltage drops below the first comparison voltage, and the output voltage being compared with the second comparison voltage and the binary signal being moved into its second binary state and the maximum peak voltage being reset to a lower output voltage if the output voltage rises above the second comparison voltage.

In known methods for reading bar codes, the comparison voltage used to generate binary signals illustratively has been set at half the difference of the peak values of the output signal from the photo-electric transducer. This comparison voltage is compared with the transducer output voltage for the detected, instantaneous brightness and the comparison result is present as a binary signal. To achieve an adequate signal, the photo-electric transducer must have a minimum surface. This ensures that there will be a comparatively slow and constant change of the transducer output signal and with slight slope, instead of an abrupt change, at the transition sites of the bright and dark zones. As a result the position along the valuation-track code where the comparison voltage equals the instantaneous transducer output voltage depends substantially on the peak values and already varies with slight fluctuations of the average brightness of the bright or dark zones. It was found within the scope of this invention that the reliability of reading a valuation code of high information density is substantially degraded thereby.

This is especially the case in test-strip analysis because soiling the valuation code and hence fluctuations of the average brightness of the bright and dark zones frequently are inevitable.

The invention makes it possible to reset the maximum or minimum peak voltage following detection of a bright or dark zone on the track of an optic code into a defined initial state. The next extreme value in the output signal, ie the next zone with a brightness maximum or minimum is reliably detected thereby, regardless of noise caused by undesired brightness fluctuations being superposed on the output signal.

Two comparison signals being taken, of which one may be used to detect the maximum and the other to detect the minimum in the output signal, the path of the relative motion between the optical transceiver and the code from the site of the maximum or minimum brightness of a zone to the site where the binary signal is switched into a predetermined binary state can be extraordinarily small. Accordingly the method of the invention allows analyzing sequences of bright and dark zones tightly arrayed along the track's scanning direction. Hence high-information density tracks can be read reliably.

It is especially important that the space between the edge of a bright or dark zone of the code and the corresponding change in binary-signal state be constant with high accuracy. In other words, the spatial phase shift between the data contained in the zones and the binary signal is extensively constant. This is of foremost importance when several tracks are being read simultaneously and the zones of the tracks are related by a specific phase.

In a preferred further embodiment of the invention, the difference of maximum and minimum peak values is ascertained and the first and/or second quantity is set equal to a fraction of this difference.

The quantities define the spatial phase angle by which the binary signal lags the brightness maximum or minimum. The steps of this further embodiment ensure that an offset signal contained in the output voltage shall be removed and that the quantities shall always be in a predetermined ratio to the particular peak voltages. As a consequence the spatial phase angle remains constant, even when the output voltage is being varied in multiplicative manner on account of a drop in brightness. This makes it possible to reliably analyze binary data recorded on several simultaneously scanned tracks and with zones of which the relative phases are fixed.

A further embodiment is characterized in that a timing binary signal is obtained from the zones of a first track on the support, in that a data binary signal is generated from the zones of at least one other track parallel to the first, the zones of the first and at least second track being in a predetermined mutual array, and in that the relation of the timing binary signal to the data binary signal is made use of to gain information.

These steps make it possible to implement the readout of stored data regardless of the relative speed of transducer and support, and even impulsive motion with periods of stoppage are admissible. This embodiment mode is especially advantageous when the support is displaced manually, for instance in the case of portable, optical readers.

The method steps of the invention can be embodied in simple manner using electronic circuits. However the method steps also may be program-controlled using data-processing equipment. Appropriately then the transceiver output voltage is converted into digital form and the peak voltages as well as the comparison voltages are appropriately digitized. Thereupon the comparison voltages, the implementation of the comparisons etc. will take place in digital manner in the data-processing equipment.

BRIEF DESCRIPTION OF THE DRAWINGS

Further features and advantages of the invention are discussed in the description below elucidating the invention by means of illustrative embodiment modes shown in the drawing.

DESCRIPTION OF THE PREFERRED EMBODIMENTS

Figure 1:
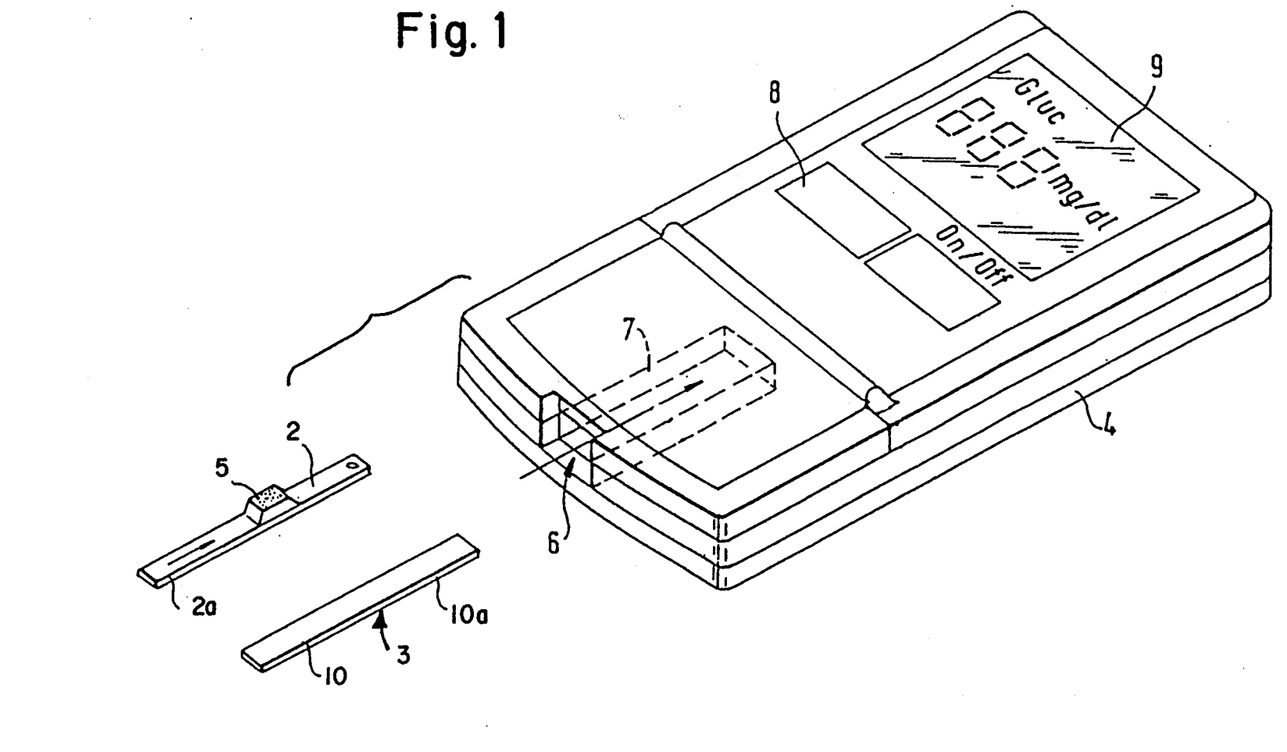
FIG. 1 is an analyzer shown in perspective.

FIG. 1 shows a test-strip analyzer system consisting of test-strips in the form of lamellar test media 2, code substrates 10 and a valuation device 4.

The test medium 2 and the code substrate 10 are the same size. Their support layer 2a or 10a in each case consists of a stiff plastic foil. The test medium 2 comprises a single test zone 5 in this embodiment, said zone where called for being several test layers. The valuation code 3 is mounted on the underside of the code substrate 10 and therefore does not show in FIG. 1.

The valuation device 4 comprises an insertion aperture 6 allowing the selective insertion of a test medium 2 or a code substrate 10 in the test medium seat 7 shown in dashed lines in FIG. 1 inside the analyzer. Upon insertion, a relative motion takes place between a photo-electric transducer (not visible in FIG. 1) stationary at the test medium seat and a valuation code mounted on the underside of the code substrate 10. A keypad 8 is provided to operate the analyzer. The measurement results are shown in a display 9.

Figure 2:
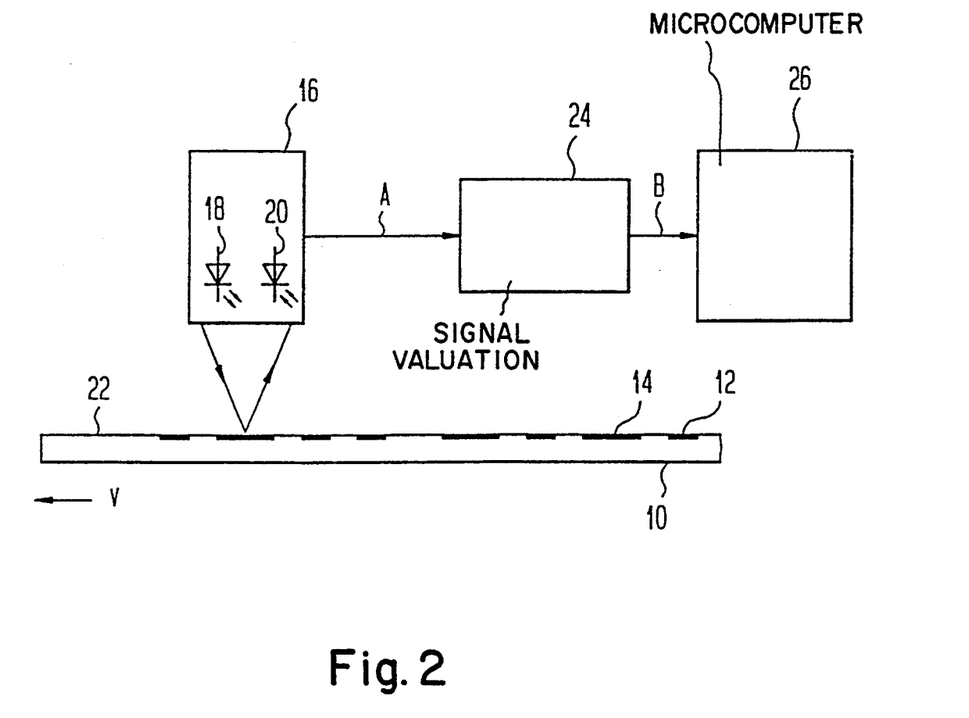
FIG. 2 a block circuit diagram of a reader for the valuation code on a code substrate of a test-strip analyzer.

FIG. 2 schematically shows a reader in the form of a block circuit diagram to read the valuation code 3 present on the code substrate 10. The code is a bar code with bright and dark zones 12, 14, the data being coded along the width and in the sequence of these bright and dark zones.

The shown photo-electric transducer comprises an infrared (ir) transmitter 18 irradiating the surface of the code substrate 10. The bright and dark zones 12, 14 modulate the reflected radiation. A radiation sensor 20 detects the reflected radiation and converts it into a voltage. Because the photo-electric transducer in this case operates on reflection, it is denoted hereafter as the optical transceiver 16. The signal from the radiation sensor 20 is amplified and is present at the output of the optical transceiver 16 as the output signal A.

The output signal A is fed to a signal analyzing unit 24 that extracts a binary signal B from the signal A, said signal B containing the data stored on the code card 10. The binary signal B is fed to a microcomputer 26 which processes it further.

The code substrate 10 is manually inserted into the reader and is moved at a speed which can vary as required underneath the optical transceiver 16. The code substrate 10 comprises a bright initial segment 22 which is used, in a manner described further below, to switch the transmitter 18 from a "standby", pulsed state, into an operational state during which the transmitter 18 emits radiation continuously.

Figure 3:
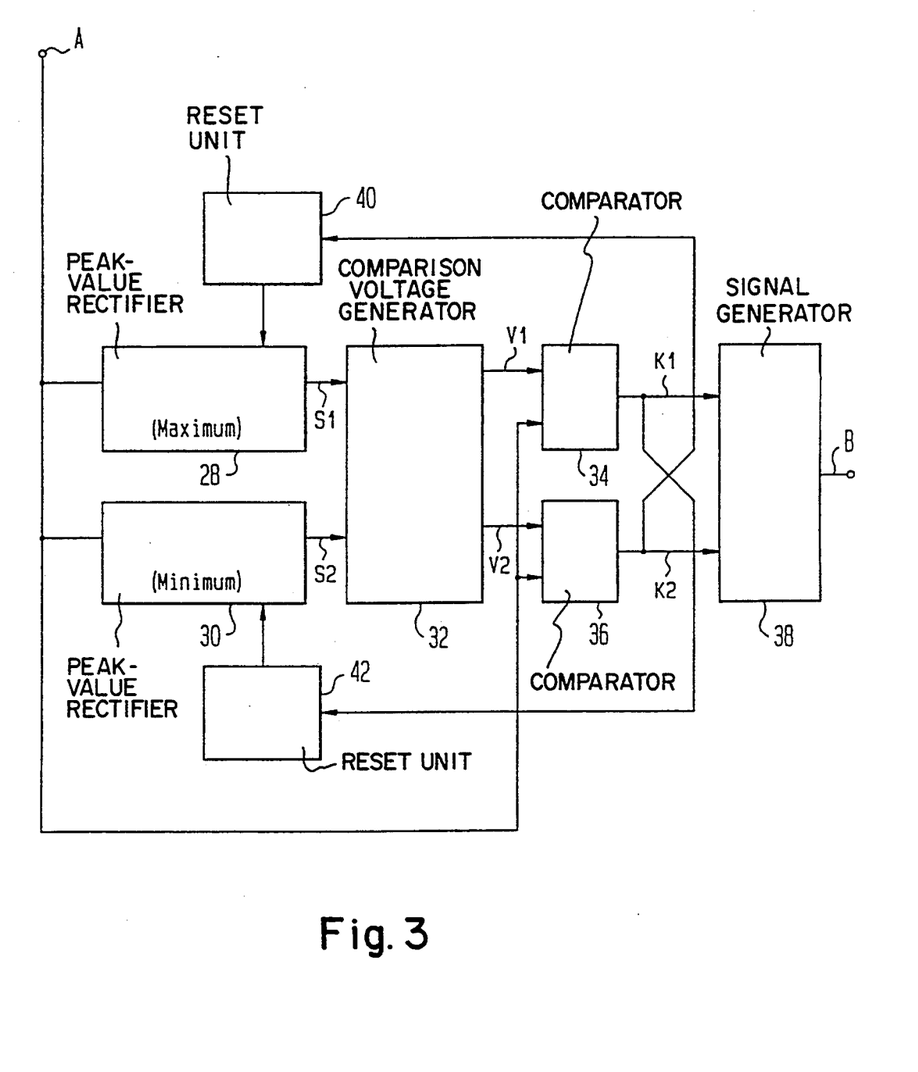
FIG. 3 is a block circuit diagram of a circuit analyzing binary data on synchronizing or data tack of a code substrate, FIG. 4 a circuit diagram relating to a circuit as shown in FIG. 4.

FIG. 3 shows a block circuit diagram of a circuit for a signal valuation unit 24. The output voltage A is fed to a maximum peak-value rectifier 28 and to a minimum peak-value rectifier 30, which hold the maximum peak-voltage S1 and the minimum peak-voltage S2 resp. for the duration of the output voltage A. The peak voltages S1 and S2 are fed to a comparison-voltage generator 32 which forms a difference-voltage from the peak voltages S1 and S2 and generates from said difference voltage an upper comparison voltage V1 and a lower comparison voltage V2. The upper and lower comparison voltages V1, V2 each are smaller or larger by a fraction of the voltage difference S1−S2 than the peak voltage S1 or S2 resp. Preferably the fraction is 0.13- to 0.45-fold of S1−S2, and in especially preferred manner, it shall be 0.20- to 0.35-fold. The upper comparison voltage V1 is fed to the input of a maximum comparator 34 and the lower comparison voltage is fed to the input of a minimum comparator 36. The output voltage A is applied to the reference inputs of comparators 34, 36.

The output voltage K1 from the maximum comparator 34 is fed to a signal-generating component 38 and to a minimum reset unit 42 acting on the minimum peak-value rectifier 30. The output voltage K2 of the minimum comparator 36 is fed to the other input of the signal-generating component 38 and to a maximum reset unit 40 acting on the maximum peak-value rectifier 28. The component 38 generates digital signals from the output voltages K1, K2 that the microcomputer 26 is able to process.

Figure 4:
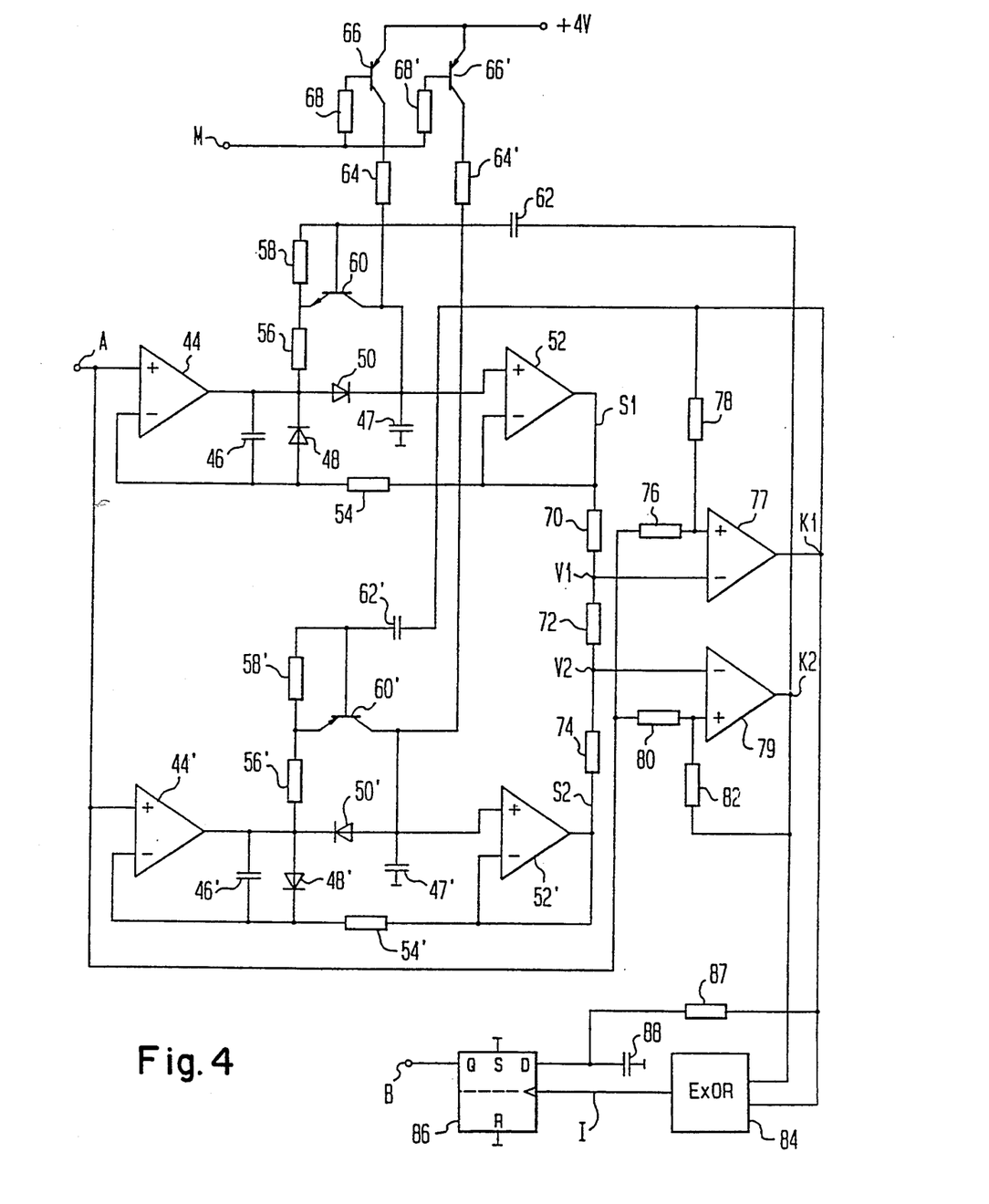

FIG. 4 is a circuit showing the design of the assemblies of FIG. 3.

The maximum peak-value rectifier 28 of FIG. 3 consists in FIG. 4 of the components 44 through 54. The output voltage A is fed to the non-inverting input of an operational amplifier 44. In the case of positive voltages, the capacitor 47 charges by feedback through the operational amplifiers 44, 52 by means of the resistor 54 through the diode 50. Its voltage is present at the output of the operational amplifier 52 as peak voltage S1 with little internal resistance. When the output voltage drops again and becomes smaller than the voltage S1, diode 50 becomes blocking and prevents back discharge of the capacitor 47. The peak value of the output voltage A remains stored in the capacitor 47 because this capacitor cannot discharge either through operational amplifier 52 switched into the electrometer position nor through the diode 50. The peak value is held until conditions for a reset occur. The diode 48 prevents saturating the operational amplifier 44 and clamps its output to a voltage which is one diode threshold below the output voltage A. The capacitor 46 suppresses any oscillation in the operational amplifier 44.

The minimum peak-value rectifier 30 of FIG. 3 consists in FIG. 4 of approximately the same parts as the maximum peak-value rectifier 28 described above. The corresponding parts are denoted by the same reference numerals, but primed. The diodes 48' and 50' are arrayed in such a way in their polarities that the minimum peak-voltage S2 with low source resistance is present at the output of the operational amplifier 52'.

The comparison-voltage generator 32 of the block-circuit diagram of FIG. 3 is shown in FIG. 4 as a voltage divider consisting of the resistors 70, 72 and 74. These resistors are arranged in such a way that the voltage between the resistors 72, 74 and corresponding to the difference-voltage of the peak voltages S1 and S2 is higher by 0.22-fold the difference voltage than the peak voltage S2 and in that the voltage between the resistors 70, 72 is lower by 0.22-fold the difference voltage than the peak voltage S1. The output voltage from the operational amplifiers 52 and 52' is fed to the voltage divider with the resistors 70 through 74, and consequently the comparison voltages V1 and V2 are fractions of the differences between the peak-voltages S1 and S2.

The comparison voltages V1, V2, each are fed to an input of an operational amplifier 77 and 79 resp. that are arranged as comparators. The output voltage A is fed to the reference inputs of theses amplifiers 77, 79. The amplifiers 77, 79 are connected in positive feedback by the resistors 76, 78 and 80, 82 resp., as a result of which their comparison operation evinces switching hysteresis. Therefore, on one hand, the tendency of the comparators 77, 79 to oscillate at the time of switching is suppressed, and on the other hand, the hysteresis limits downward the range of amplitudes that still can be processed of the output voltage A: if the output voltage is quite small, the voltage difference formed between the output voltage and the peak voltage S1 or S2 no longer exceeds the hysteresis, and hence these signals no longer are analyzed. The noise or interference suppression in the circuitry is enhanced thereby.

The maximum reset-unit 40 of FIG. 3 is shown in FIG. 4 by the components 56 through 62. The base of the npn transistor 60 receives through the capacitor 62 a positive current pulse for positive pulse edges of the output voltage K2 from the operational amplifier 79, said pulse making the transistor conducting. Thereupon the capacitor 47 can discharge through the resistor 56 and the operational amplifier 44 and, following the decay of the balancing processes, the voltage at the capacitor 47 and hence the peak-voltage S1 is equal to the instantaneous value of the output voltage A. The time-constant resulting from the series circuit of the collector-emitter resistance of the transistor 60, the resistor 56 and the capacitor 47 essentially determines the duration of the discharge. A preferred discharge time shall exceed 50 µs. In the present illustration the discharge is exponential. However the discharge may be made linear if so called for. Resistor 58 supplies a defined potential to the base contact of transistor 60 to prevent it from floating, keeping transistor 60 blocked as long as no positive current pulse is received through capacitor 62.

The minimum reset-unit 42 of FIG. 3 shown in FIG. 4 evinces a similar circuit as the above described maximum reset unit 40. Accordingly the corresponding components are denoted with the same but primed references. Be it noted that the transistor 60' is pnp and will be conducting for negative. pulse edges.

The signal generator 38 of FIG. 3 is shown in the circuit of FIG. 4 as an EXCLUSIVE OR component 84 receiving the output voltages K1 and K2 and a subsequent dynamic D flipflop 86. The output voltage at the component 84 is used as an interrupt signal I and is fed to the trigger input of the flipflop 86. Every positive pulse edge of this output voltage and thereby each detected extremum in the output signal A initiates a change in pulse edge at the output Q of the flipflop 86. In addition, by applying the output voltage K1 through an RC circuit consisting of the resistor 87 and capacitor 88, synchronization is achieved between the direction of the change in pulse edge at the flipflop output Q with the kind of detected extremum. A maximum is signalled by a rising pulse edge and a minimum by a falling pulse edge. The RC circuit delays the signal K1 from the operational amplifier 77 and thereby the data input D shall be reliably at the H level (maximum) or at the L level (minimum) at the time of synchronization.

The further circuit components 64 through 68 and 64' through 68' are discussed further below.

Figures 5A, 5B, 5C, 5D, 5E:
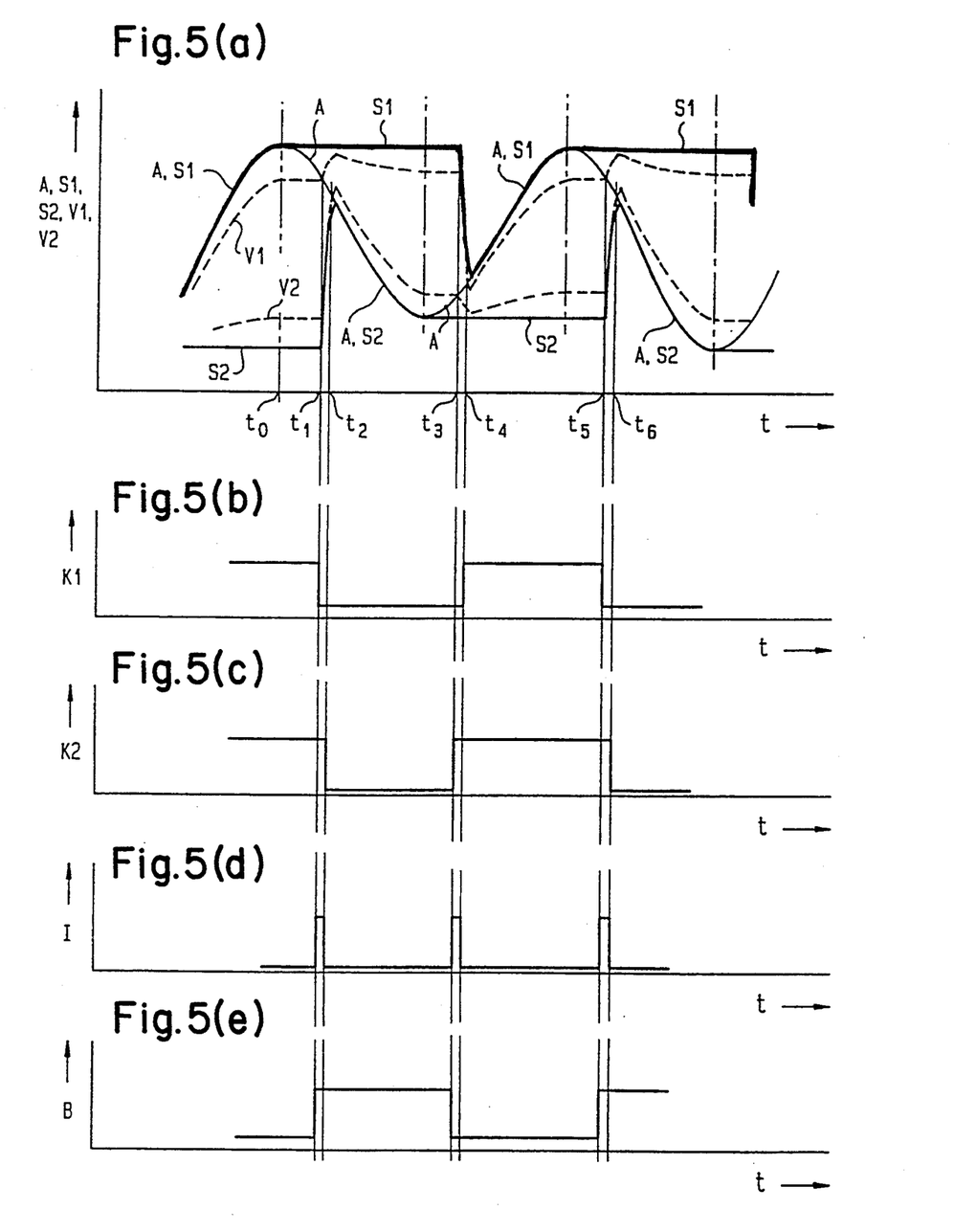
FIG. 5 shows plots of signals which are a function of time when scanning a synchronized track.

FIG. 5 shows the signals A, S1, S2, V1, V2, K1, K2, I and B as a function of time when operating the circuits of FIGS. 2 or 3 when optically scanning the code substrate 10 at a constant rate v. In FIG. 5a, first the output voltage A rises because the optical transceiver 16 is located above a bright zone 12. The peak-voltage S1 (bold, solid line) rises accordingly and at time t0 reaches its maximum. The comparison voltage V1 (dashed line) reduced by 0.22-fold the difference voltage follows the peak voltage S1. After the bright zone 12 has been left behind, at time t1, the output voltage A (thin line) has dropped to a value equal to the comparison voltage V1. The comparator 34, ie the operational amplifier 77 now switches into its either state and sets its output signal K1 to a lower voltage than previously, as shown by FIG. 5b. The corresponding switching pulse edge in the signal K1 resets the peak voltage S2 to the instantaneous value of the output voltage A. This reset takes place exponentially and ends after about 100 µs (resetting time). This step readies the circuit for detecting the minimum of the output voltage A that follows the maximum. This minimum may have another magnitude than the preceding one.

The comparison voltage V2 is larger than the minimum peak voltage S2 by 0.22-fold the difference between the peak voltages S1 and S2. Now the value of the comparison voltage V2 exceeds at time t2 the output voltage A, as a result of which the minimum comparator 36 switches and sets its signal K2 to a lower voltage than before (FIG. 5c). As a function of the reset time, the time shift of the pulse edges of the comparator signals K1 and K2 is about 100 µs. Thereupon the minimum peak voltage S2 follows the output signal A until latter has met its minimum. At time t3 the output voltage A exceeds the voltage of the comparison voltage V2 and signal K2 is switched. At the same time the maximum peak voltage S1 is reset to the instantaneous value of the output voltage A. At time t4, the comparator 34 also switches, and the circuit is ready to ascertain the next maximum of the output voltage A. Time $t_5$ is the point at which the output voltage once again drops to a value equal to the comparison voltage V1, With $t_6$ being the point at which comparator 36 switches and sets signal K2 to a lower voltage. This cycle is repeated.

The signals K1 and K2 are linked by the EXCLUSIVE OR circuit 84 and the signal shown in FIG. 5d is generated. The flipflop 86 timed by the interrupt signal I then generates the binary signal shown as a function of time in FIG. 5e. The interrupt signal I is fed to the microcomputer 26 (see FIG. 2) scanning the binary-signal B function in time-controlled manner.

An illustrative embodiment of the invention is described below, wherein the optical transceiver 16 is switched from a standby to an operational state. As a rule reading the code substrate 10 takes place only during a fraction of the time the optical transceiver is ON. As regards battery-operated readers, advantageously the optical transceiver 16 shall be set to a standby state wherein substantially less electrical power is dissipated than during the scanning phase. In this standby state the transmitter 18 is activated only in pulses. A code substrate inserted into the reader however must be sensed without undue delay so that the transmitter 18 can be switched to constant power ON during which time the surface of the code substrate 10 is continuously illuminated and the microcomputer 26 can be switched into the read mode in order to analyze the binary signal B.

In this further embodiment of the invention, the power for the transmitter 18 is ON for 2 ms in the standby state and then is shut off for 20 ms. Compared with constant operation, a saving in energy by about a factor of 11 is thus achieved.

As shown by the circuit of FIG. 4, the microcomputer 26 emits a signal M to set the standby or wait condition. This signal is formed by the microcomputer following a readout. The signal M passes through the resistors 68, 68' to the base of the pnp transistors 66 and 66' which thereupon become conducting. The emitters of these transistors 66, 66' are loaded by a reference potential of 4 v. The capacitor 47 is charged through the resistor 64 to the reference potential. At the same time the capacitor 47' is charged to the instantaneous value of the output voltage A. Accordingly the circuit is on standby. While the transmitter 18 is ON, the signal M is at a positive voltage larger than the reference potential of 4 v. The transistors 68 and 68' then are blocking. The time constant formed by the resistor 64 and capacitor 47 is such that there is a delay in charging the, capacitor 47 until the microcomputer 26—following detection of a code substrate—switches the transmitter 18 into steady state.

Figure 6:
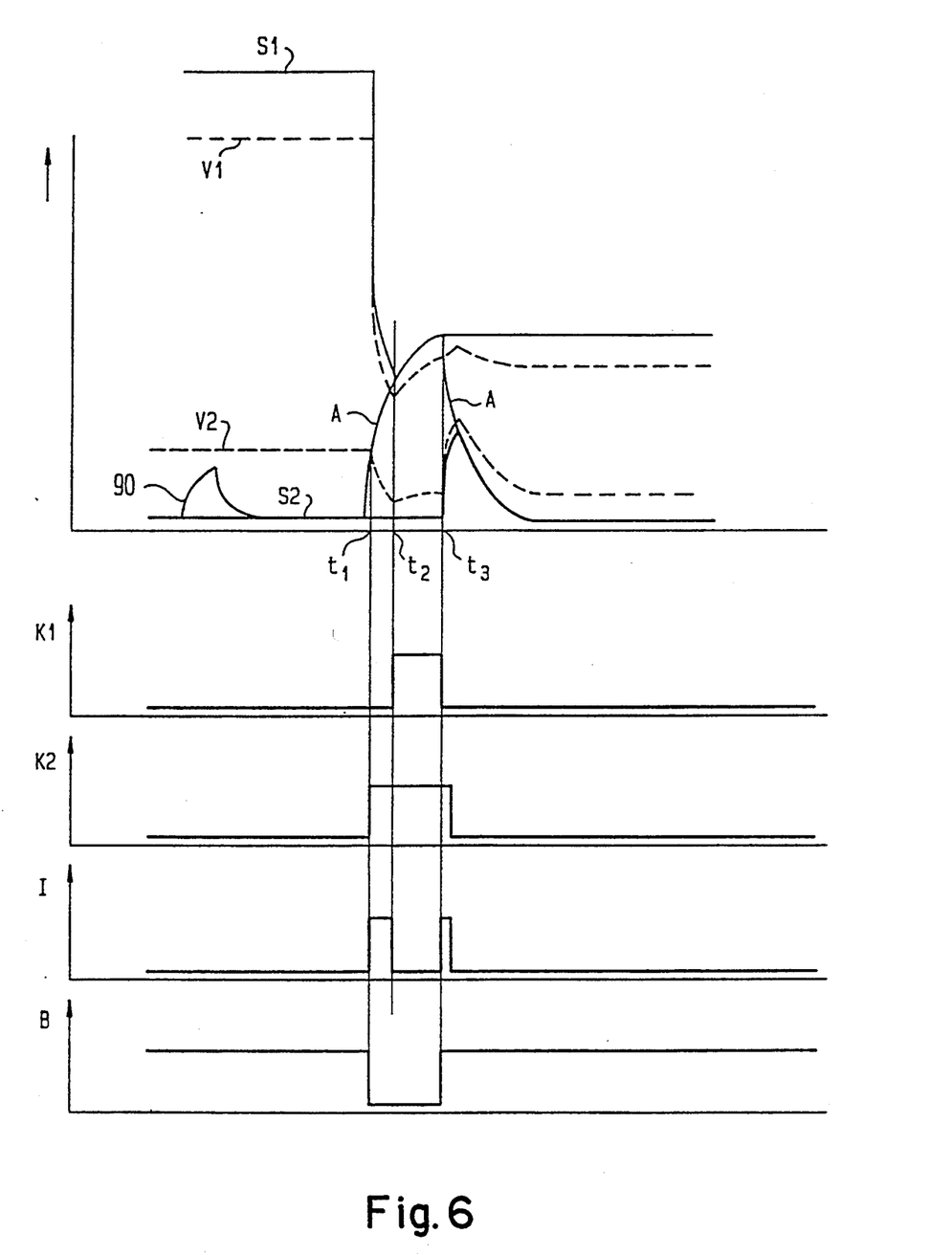
FIG. 6 shows plots of signals as a function of time in the detection of code substrates, if any

FIG. 6 shows the operation of an illustrative embodiment. In standby there is no code substrate in the reader. The radiation pulse emitted by the transmitter 18 is incident on a dark background and is reflected only little. The optical transceiver 16 only emits a small, pulse-shaped output voltage A as shown in FIG. 6 at 90. As long as the output voltage A does not exceed the comparison voltage V2, the circuit remains unaffected. Be it borne in mind in this respect that any offset voltage superposed on the output voltage A is without influence because merely voltage differences are being analyzed.

If now a code substrate 10 is inserted by its tip 22 into the reader, then its brightly reflecting surface generates a comparatively large voltage pulse in the output voltage A as shown in the right-hand upper part of FIG. 6. At time t1 the output voltage A exceeds she comparison voltage V2, and thereby the signal K2 switches and the peak voltage S1 is reset. At time t2 the output voltage A also exceeds the comparison voltage V1, and thereby the signal K1 is switched into its other state. After the maximum has been exceeded, the output voltage A drops below the value of the comparison voltage V1, and at time t3 the signal K1 of the comparator 34, or 77, is reset. The binary signal B comprises a negative pulse of 2 ms which is used by the microcomputer to switch over to constant power ON. The EXCLUSIVE OR circuit 84 moreover generates a positive pulse edge in the interrupt signal I to allow analyzing the interrupt-controlled binary signal B.

Figure 7:
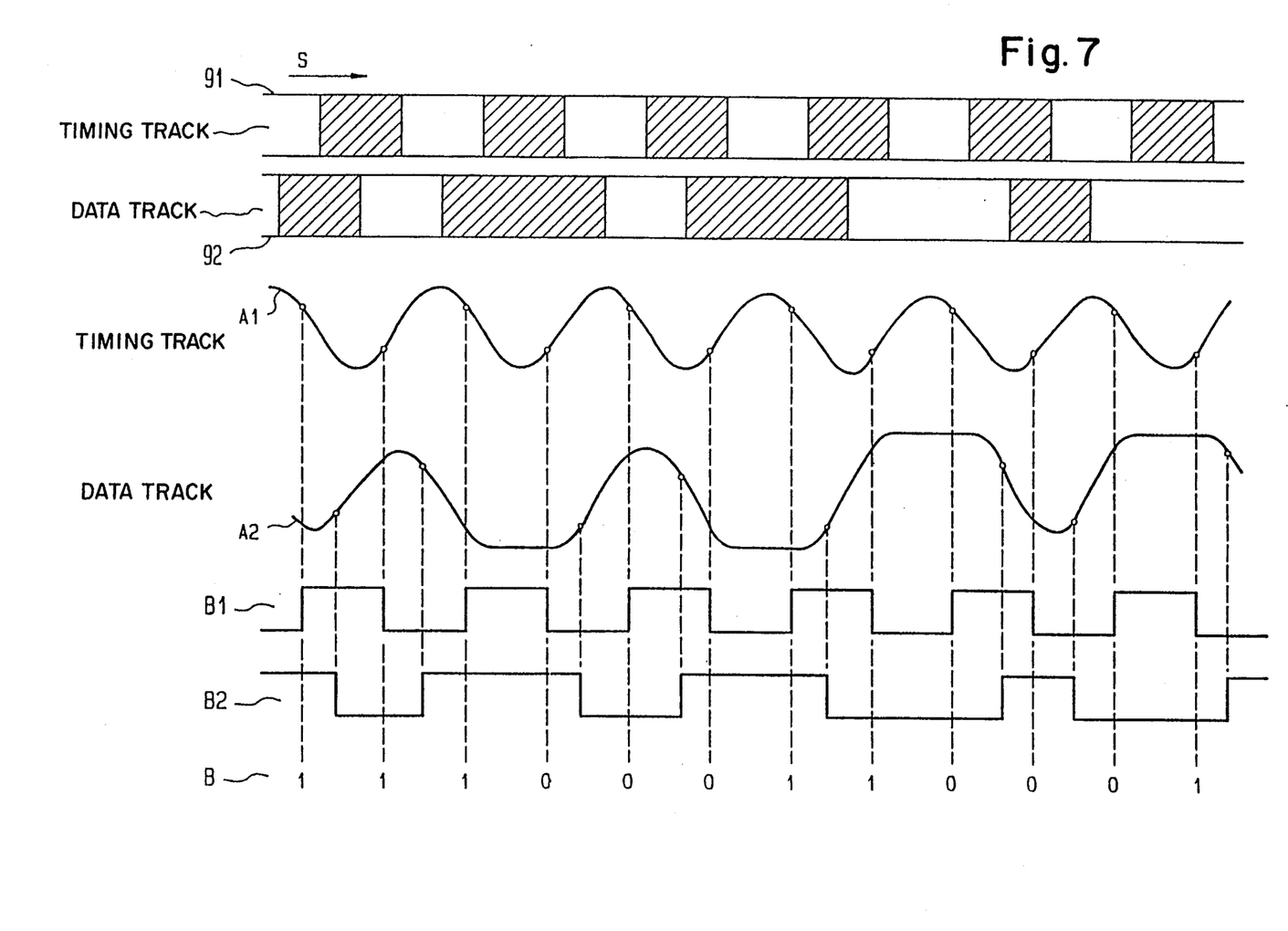
FIG. 7 shows the signals as a function of path "s" when moving a code substrate, having a reference track and a data track, relative to a photo-electric transducer.

FIG. 7 shows the signals of the output voltages A and the binary signals B1 and B2 along two tracks of a code substrate. Bright and dark zones are present at regular intervals along a first timing track 91 and are in a defined position relative to the zones of a second track 92 which is denoted as the data track. The tracks 91 and 92 are read simultaneously each by an optical transceiver using a two-track code reader. Using the above described circuits and procedures, the corresponding binary signals B1 and B2 are determined from the associated output voltage A1 of the timing track 91 and from the output voltage A2 of the data track. The locations where the output signals K1 and K2 of the comparators 34 and 36 are switched are shown drawn into the output voltages A1 and A2 resp. At those locations the states of the corresponding binary signals B1 of the timing track or B2 of the data track will change. The shown locations each are a constant distance from the previous extremum value, that is from the brightness maximum or minimum. The phase relations between the zones of the timing track 91 and data track 92 therefore are retained during analysis. No time shifts take place that might cause reading errors.

The two binary signals B1 and B2 are related by means of an EXCLUSIVE OR circuit to a binary signal B containing the data coded in the tracks 91 and 92. The logic levels of the signal B resulting from linking the binary signals B1 and B2 are shown at the bottom of FIG. 7.

I claim:
1. A method for analyzing a component of a liquid sample, said method comprising the steps of:
providing a test-strip analyzer including a test-strip, a code substrate, and a valuation device, wherein the test-strip includes reagents, and wherein the component of the liquid sample reacts with the reagents, the reaction between the reagents and the component resulting in a physically detectable change, the code substrate including a binary valuation code comprising bright and dark zones along at least one track and arrayed according to a predetermined symbols code, the valuation device including a test-strip seat to position a test-strip into a measurement position to measure the physically detectable change and to generate a measurement signal, the valuation device also including a code reader to read the valuation code contained on the code substrate, and computation means to compute an analytical result from the measurement signal taking into account the valuation code; said method further comprising the steps of initiating a relative motion between the code substrate and an optical-electrical transducer of said valuation device;

generating a binary signal in said analyzer during said relative motion of said optical transducer scanning at least one track of the valuation code, said binary signal containing information relating to the valuation code;

generating an output voltage from detected brightness values, with a present maximum peak voltage value of the output voltage for each bright zone being ascertained thereby when reading a bright zone, wherein a peak detection is carried out such that the present maximum peak voltage value follows the output voltage when the output voltage is rising above the present maximum peak voltage value and the present maximum peak voltage value is held constant when the output voltage is falling or constant, the present maximum peak voltage value being also held constant during reading a dark zone, until a reset to a first peak voltage value lower than the present maximum peak voltage value is performed; and a present minimum peak voltage value of the output voltage for each dark zone being ascertained when reading a dark zone, wherein a peak detection is carried out such that the present minimum peak voltage value follows the output voltage when the output voltage is falling below the present minimum peak voltage value and the present minimum peak voltage value is held constant when the output voltage is rising or constant, the present minimum peak voltage value being also held constant during reading a bright zone, until a reset to a second peak voltage value higher than the present minimum peak voltage value is performed;

generating a present first comparison voltage which is less by a predetermined first amount than the present maximum peak voltage value;

generating a present second comparison voltage which is larger by a predetermined second amount than the present minimum peak voltage value;

comparing the output voltage with the present first comparison voltage and moving the binary signal into a first binary state and resetting the present minimum peak voltage value to the second peak voltage value when the present output voltage drops below the present first comparison voltage; and comparing the output voltage with the present second comparison voltage and moving the binary signal into a second binary state and resetting the present, maximum peak voltage value to the first peak voltage value when the output voltage rises above the present second comparison voltage and inserting a code substrate into the code reader, thereby reading the valuation code contained thereon during the relative motion, inserting a test strip into the test strip seat, measuring the physically detectable change and analyzing therefrom the component of the liquid sample which was contacted to the test strip by the computation means, thereby taking into account the valuation code.

2. A method according to claim 1, further comprising the step of determining a difference between successive maximum and minimum peak voltage values, and wherein at least one of the first and second predetermined amounts is a fraction of the determined difference.

3. A method according to claim 2, wherein the first and the second predetermined amounts are the same magnitude.

4. A method according to claim 2 wherein the first predetermined amount is 0.13 to 0.45 times the difference.

5. A method according to claim 2, wherein the second predetermined amount is 0.13 to 0.45 times the difference.

6. A method according to claim 1, wherein the present maximum peak-voltage value is reset to a present value of the output voltage.

7. A method according to claim 1, wherein the present minimum peak-voltage value is reset to a present value of the output voltage.

8. A method according to either of claims 6 or 7, wherein the steps of resetting the present minimum and maximum peak-voltage values takes place within a predetermined time interval.

9. A method according to claim 8, wherein said predetermined time interval is in excess of 50 $\mu$s.

10. A method according to claim 1, wherein the valuation code is a bar code.

11. A method according to claim 1, wherein a transmitter and a receiver of the optical-electrical transducer are disposed on a same side of the code substrate and wherein the valuation code is read in a reflection mode.

12. A method according to claim 1, wherein the valuation code on the code substrate is illuminated by a light source, said light source being switched between pulse operation in a standby mode and constant power operation when reading a track of the valuation code.

13. A method according to claim 12, wherein switching takes place dependent upon a signal indicating whether a code substrate is present.

14. A method according to claim 1, wherein the code substrate includes two mutually parallel tracks, and wherein a timed binary signal is generated when reading a first track and a data binary signal is generated when reading a second track, the bright and dark zones of the first track and of the second track being mutually arrayed in a predetermined manner, and wherein the relation of the timed binary signal to the data binary signal is analyzed to obtain the information.

15. A method according to claim 14, wherein the timed binary signal and the data binary signal are linked by an exclusive OR gate.

16. A test-strip analyzer for analyzing a component of a liquid sample, said test-strip analyzer comprising:

a test-strip containing reagents which react with said component of the liquid sample, the reaction between the reagents and the component resulting in a physically detectable change;

a code substrate including a binary valuation code having bright and dark zones along at least one track thereof and arrayed according to a predetermined symbols code;

a valuation device for detecting the physically detectable change, analyzing the component of the liquid sample of the test-strip and for reading the code substrate, said valuation device including a test-strip seat to position the test-strip into a measurement position to thereby measure the physically detectable change, and to generate a measurement signal, said valuation device comprising a code reader to read the valuation code contained on the code substrate, and computation means to compute an analytical result from the measurement signal;

an optical-electrical transducer for generating a binary signal as a result of a relative motion between the code substrate and the transducer;

circuit means for providing an output voltage from the optical transducer to a maximum peak voltage rectifier and to a minimum peak voltage rectifier, said circuit means thereby determining the respective maximum peak voltage of the output voltage when reading a bright zone and the respective minimum peak voltage when reading a dark zone, said circuit means providing the peak voltages to a comparison voltage generator thereof, said comparison voltage generator generating first and second comparison voltages from the difference between successive maximum and minimum voltages and providing said first and second comparison voltages to first and second comparators disposed therein, said first and second comparators comparing the first and second comparison voltages with the output voltage, and generating a binary signal as a function of the comparison, wherein the binary signal contains the information to be analyzed, and wherein the first comparison voltage is less by a predetermined first fraction of the difference than the maximum peak voltage and the second comparison voltage is larger by a predetermined second fraction of the difference than the minimum peak voltage, said circuit means providing a first and second reset component to reset the maximum and minimum peak voltages to a present value of the output voltage as a function of the binary signal output from the second and first comparators, respectively.

17. A test-strip analyzer according to claim 16, said comparison voltage generator comprising a voltage divider circuit including at least three resistors, said resistors having resistance values which are related to each other by the first and second fraction.

18. A test-strip analyzer according to claim 16, wherein the first and second fractions are equal to each other and are between 0.13 and 0.45.

19. A test-strip analyzer according to claim 16, wherein an exclusive OR circuit is provided, said exclusive OR circuit receiving output signals of the first and second comparators at inputs thereof and emitting an interrupt signal at an output thereof, wherein a dynamic D flipflop is provided, said dynamic D flipflop receiving at a timing input thereof the interrupt signal, and receiving the output signal from the first comparator at a D input thereof.

* * * * *